United States Patent [19]

Opitz et al.

[11] Patent Number: 5,088,967
[45] Date of Patent: Feb. 18, 1992

[54] PLANETARY ASSEMBLY WITH WET DISK BRAKE

[75] Inventors: Andor Opitz; Lóránt Tar, both of Györ, Hungary

[73] Assignee: Magyar Vagon- és Gépgyár, Györ, Hungary

[21] Appl. No.: 462,689

[22] Filed: Jan. 3, 1991

[30] Foreign Application Priority Data

Jan. 3, 1989 [DE] Fed. Rep. of Germany ....... 3900075

[51] Int. Cl.$^5$ .................. F16H 57/10; B60K 41/26
[52] U.S. Cl. ..................... 475/107; 192/4 A;
180/10; 188/1.11; 188/18 A
[58] Field of Search ............ 188/1.11, 264 B, 264 D,
188/264 E, 264 CC, 264 P, 18 A, 352; 192/4 A;
475/107, 311, 159; 74/467, 606 A; 180/372, 10

[56] References Cited

U.S. PATENT DOCUMENTS

| | | | |
|---|---|---|---|
| 4,037,694 | 7/1977 | Keese ................... | 192/4 A |
| 4,142,615 | 3/1979 | Sidles, Jr. et al. ........ | 192/4 A |
| 4,186,822 | 2/1980 | Khuntia et al. .......... | 188/1.11 |
| 4,407,382 | 10/1983 | Dziuba et al. ........... | 180/10 |
| 4,940,115 | 7/1990 | Sugden ................. | 74/467 X |

FOREIGN PATENT DOCUMENTS 1595713  8/1981  United Kingdom .............. 192/4 A

Primary Examiner—Leslie A. Braun
Assistant Examiner—Matthew Stavish
Attorney, Agent, or Firm—Spencer & Frank

[57] ABSTRACT

The planetary assembly with wet disk brake of the invention comprises a hollow spindle (3) rigidly fixed to an axle house (1) of a running gear of a vehicle, a hollow wheel hub (5) carrying a wheel (7), the wheel hub (5) being rotatably supported in a roller bearing (8, 9) mounted to the spindle (3), an input axle-shaft (4) passing through a bore made in the spindle (3), a hollow ring gear support member (11) arranged on the periphery of the spindle (3) secured against angular displacement and prepared with splines (3) arranged on its internal side, a planetary mechanism linked up with the input axle-shaft (4) on its input side and with the wheel hub (5) on its output side, and being fitted with a ring gear (32) coupled in torque transmitting way to the splines (13) of the ring gear support member (11), wet disk brake assembly (16) fully accommodated in the ring gear support member (11i) as a self-contained unit, where the wet disk brake assembly (16) is arranged so that the external splined disks (26) and the thrust disk (27) are linked up with the splines (13) on the internal side of the ring gear support member (11), and the thrust disk (27) bears axially against the ring gear support member (11), and the brake piston (17) is guided in the ring gear support member (11) in an axially displaceable and sealed way.

15 Claims, 4 Drawing Sheets

PLANETARY ASSEMBLY WITH WET DISK BRAKE

FIELD OF THE INVENTION

The present invention relates to a planetary assembly with wet disk brake for vehicles, with input axle-shaft, with a planetary gear attached, on the one hand, to the input axle-shaft 4 and, on the other hand, to a wheel hub carrying the wheel of the vehicle and comprising a wet multiple disk brake assembly. Generally, such mechanisms are employed in the axle of heavy vehicles exposed to particularly high stresses, such as in muckshifters, mining machines, agricultural power machines and vehicles for handling and transporting materials.

BACKGROUND OF THE INVENTION

The outstanding advantages of the known planetary assemblies having wet disk brakes is experienced in conditions where the braking force is applied—instead of braking the hub directly—to the sun wheel of the planetary assembly driving the hub or to the axle-shaft driving the sun wheel. In these cases the braking torque acting on the multiple disk brake mechanism is reduced in the ratio of the planetary mechanism. A further advantage of such mechanisms results from limiting the disturbing effects of the polluted environment usually associated with heavy duty vehicles, said mechanisms being immersed in the oil space of the axle. But also the utilization of oil filling of the axle for cooling the brake offers advantages.

It is expedient to mount the mechanism of such kind into the hub of the axle, and once the planetary drive is accommodated here, also the brake assembly is integrated with this mechanism. In exceptional cases, such axle arrangements—called sometimes adjustable bar type axles—are applied, where hubs, in a conventional sense of the word, are not provided. In such cases the planetary assembly is arranged in the middle portion of the axle, so that expediently also the brake assembly is integrated with the middle portion.

Examples of such known brake assemblies are described, among others in the U.S. Pat. Nos. 3,754,625, 4,037,694 and 4,646,880. The essential advantages mentioned above are characteristic of all such mechanism, but unfortunately they have also certain unfavourable properties that can be summarized as follows:

Because the hub mechanism is composed of two main assembly units (planetary mechanism and brake mechanism), the drawbacks of designs known from the art are concentrated in these two main fields or, in several cases, result from the unfavourable interaction of these two units.

1) As regards the useful life period, the load carrying capability and silent running of the planetary mechanism, it is considered to be favourable if the meshing of the planetary gears occurs in optimum position and—by assuming proper dimensions—the gears are capable of correcting inexactitudes due to manufacturing deficiencies and deviations caused by deformations arising under different load conditions of the planetary gear and running gear. Furthermore, from the point of view of the planetary gears, it is also essential to relieve the gears of loads resulting from the continuously changing reaction forces of brake disks and brake pistons because these effects too, tend to impede the gears in assuming their optimum meshing position. The middle one of the three gears (sun gear, planetary gear, ring gear), i.e. the planetary gear is in fixed position in all of the mentioned cases, the planetary carrier being firmly bolted to the hub. Hence, in optimum designs, both the sun gear and ring gear are capable of self-alignment to an extent overriding the sum of manufacturing errors and maximum deformation. So in that case both the sun gear and the ring gear can adapt themselves to the planetary gears.

2) For a steady operation silent running and long service life of the brake, it is considered favourable that the number of those elements in the planetary mechanism which exert a force on the components of the brake is as small as possible and the power-transmission chain in said brake mechanism is as short as possible. Moreover it is especially harmful if some loose linkage is present in the brake mechanism (e.g. a loose meshing between the ring gear support member and the ring gear), because this tends to cause unsteady operation, resonance and noisiness of the brake.

The main drawbacks of the solutions known from the art can be summarized as follows.

The solution shown in the U.S. Pat. No. 3,754,625 cannot be realized in a form which satisfies the condition described under item 1 outlined above, because the ring gear is not self-aligning. But there are further disadvantages of this arrangement: it is provided with only one internal splined brake disk, the disk wear cannot be measured and the ring gear cannot be replaced without disassembling the brake assembly. Neither the brake, nor any element of the planetary mechanism can be replaced without putting the vehicle on blocks or dismantling the wheel.

U.S. Pat. No. 4,037,694 is silent whether the ring gear is fitted to the ring gear support member with a clearance fit or a close fit.

But neither of these fits can be considered as advantageous because on the one hand if the splines fit close, the ring gear cannot adapt itself to the planetary gear, so the planetary mechanism will fail to function perfectly. On the other hand, with a loose fit both the external splined brake disks and the planetary gears tend to dislocate the ring gears.

So, in the mechanism the ring gear cannot adjust itself to the planetary gears and, due to the loose fit, the brake splines will chatter. Further drawbacks are that the spline wear cannot be measured and the ring gear cannot be replaced without unlocking the brake.

It is still another disadvantage of the above solution that for replacing the brake retainer spring or brake piston the spindle end nut has to be dismantled, and for doing so the axle must be put on blocks.

The main drawbacks of the arrangement described in the specification of the U.S. Pat. No. 4,646,880 are the following:

i) The ring gear being fixed, it cannot align itself with its gearing to the planetary gears.

ii) For replacing the ring gear the vehicle has to be placed on blocks and the entire wheel hub has to be disassembled together with the brake mechanism.

iii) Disk wear cannot be measured.

iv) The stationary disks bear against the rotary planetary carrier, so the entire brake mechanism performs a wobbling motion corresponding to the runout of the planetary carrier, moreover the brake piston imposes an axial load on the wheel bearings as well.

SUMMARY OF THE INVENTION

A common feature of the known designs is that either condition 1 or condition 2 outlined above is satisfied, and neither of them satisfies both conditions simultaneously. With the arrangement specified in the present invention, the main objective has been to propose a design that fully satisfies both conditions without introducing other drawbacks but offers additional advantages. Hence, the object of the present invention is to create a planetary assembly with wet disk brake which satisfies both conditions 1 and 2 specified in the introductory part and is free of further disadvantages to be found in the solutions shown in the art.

Moreover the present invention also offers further essential novel features, such as the possibility of checking the wear of brake disks without disassembling the hub to the least extent, or of replacing any component of the planetary mechanism without dismounting any element of the brake assembly while permitting even the checking of proper functioning of the brake or, since the brake retainer spring is arranged in the brake piston in prestressed condition, a spring of soft characteristics favourable for brake operation can be used. These are the advantageous properties not characteristic of the solutions known so far.

Based on the above and with the objective to eliminate the disadvantages of the solutions described in the patent literature analysed, the aim to be achieved by the present invention is to provide a wheel hub for a planetary assembly with wet disk brake by which the following requirements will be satisfied:

i) The ring gear should be loosely suspended in order to permit its alignment to the planetary gears rigidly supported in their bearings, corresponding to the deformations under the imposed loads and to the manufacturing errors, so as to obtain uniform distribution of tooth loads over the entire tooth width, in order to ensure long service life and silent running of gears of the planetary assembly.

ii) The loosely suspended ring gear of the planetary assembly should not be loaded by forces acting on the brake disks, because this would prevent the ring gear from adjusting itself optimally to the tooth of the planetary gear.

iii) The brake piston, the thrust disk and the externally splined disks should be mounted into a structural portion rigidly coupled to the running gear, ensuring thereby, on the one hand, the chatter-free operation of the brake disks due to their being clamped to a fixed element, what results in steady, silent braking and, on the other hand, due to the forces being balanced within a single component, neither the gears nor the wheel bearings are loaded by the force coming from the brake piston.

iv) For prolonged safe operation of the brake the possibility of easy checking of brake disks is of primary importance. With the arrangement realized according to the present invention this checking can be performed without any disassembling operation to be carried out on the wheel hub.

v) Replacement of all elements of the planetary mechanism should be possible without requiring removal of any element of the brake assembly and before such a replacement there should be no need to dismantle either the wheel hub or a vehicle wheel.

vi) Dismantling of the brake piston, the packings, the brake disks and the thrust disk should be possible without removing either the wheel hub or the vehicle wheel.

vii) It should be possible to mount the brake retaining spring in prestressed state into the brake piston, permitting thereby the application of a spring having soft characteristics, this being favourable for brake operation.

Hence, according to the invention a planetary assembly with wet disk brake of a vehicle is proposed, which comprises a hollow spindle rigidly fixed to an axle house of a running gear, a hollow wheel hub carrying a wheel of the vehicle, the wheel hub which is rotatably supported in a roller bearing mounted to the spindle, an input axle-shaft passing through a bore of the spindle, a hollow ring gear support member having splines arranged on the periphery of the spindle, wherein the novel features lie in arranging the hollow ring gear support member in a way which excludes the possibility of its angular displacement, and in further comprising a planetary mechanism unit linked up with the input axle-shaft on the input side and with the wheel hub on the output side, the planetary mechanism being fitted with a ring gear coupled in a torque transmitting way to the splines of the ring gear support member, a wet disk brake assembly fully accommodated in the ring gear support member as a self-contained unit, the wet disk brake assembly comprising external splined disks, internal splined disks, a thrust disk, and a brake piston, arranged so that the external splined disks and the thrust disk are linked up with the internal disks of the ring gear support member, the thrust disk axially bearing against the ring gear support member, and the brake piston being guided in the ring gear support member in an axially displaceable and sealed way.

In an advantageous embodiment of the planetary assembly proposed by this invention the end of the input axle-shaft in the wheel hub on the side of the planetary assembly is provided with a toothing fulfilling the function of the sun gear of the planetary mechanism.

In a preferred further embodiment of the assembly the internal splined disks of the wet disk brake assembly are coupled in a torque transmitting way to the splines provided on the input axle-shaft.

It is also preferred, when in the wheel hub of the proposed assembly the internal splined disks of the wet disk brake assembly are coupled to the external splines of a spacer that is attached to the splines formed in a torque transmitting way on the input axle-shaft.

In another advantageous embodiment of the assembly constructed according to the present invention in the wheel hub the sun gear of the planetary mechanism is attached by means of splines to the end of the input axle-shaft. In this case it is further proposed to couple the internal splined disks of the wet disk brake assembly in a torque transmitting way to the external splined extension of the sun gear.

It is also a purposeful realization of the assembly proposed by the invention, where the planetary mechanism is coupled with the wheel hub by way of its planetary carrier, while to the sun gear the planetary gears, to the planetary gears the ring gear surrounding them, and with the latter the ring gear support member through its external gearing is coupled, whereas the external splined disks of the wet disk brake assembly are connected in a torque transmitting way to the internal splines of the ring gear support member. In this case the internal splined disks of the wet disk brake assembly are coupled to the external splined extension of the sun gear in a torque transmitting way.

It is another purposeful embodiment of the present invention, where the planetary mechanism is connected with the wheel hub by way of its planetary carrier, while to the sun gear the planetary gears, to the planetary gears the ring gear surrounding them, and to the latter the ring gear support member through its external gearing is coupled, whereas the external splined disks of the wet disk brake assembly are connected in a torque transmitting way with the internal splines of the ring gear support member. In that case it may be expedient to lock the ring gear against axial displacement by the means of a shoulder provided in the ring gear support member.

In a further expedient embodiment of the present assembly the connection between the spindle and the ring gear support member is provided partly by the radial close fit of the mating surfaces and partly by the torque transmitting splines.

It is also expedient in compliance with the present application if the wheel hub is supported in anti-friction roller bearings mounted on the spindle and on the ring gear support member and provided with at least one bearing nut arranged on the spindle for the purpose of adjusting the axial position of the ring gear support member on the spindle and the play of the anti-friction roller bearings.

The essence of a further advantageous embodiment of the proposed planetary assembly is that the external and internal splined disks of the brake assembly are alternatingly arranged between the thrust disk and brake piston. This arrangement is especially advantageous when the means for locking the thrust disk against angular rotation are arranged on the internal splines of the ring gear support member and a fixation against axial displacement in the direction opposed to the disks is provided by means of a snap ring located in the ring gear support member. It is then also possible and advantageous to design the brake piston as a circular element reciprocating in the scaled bore provided in the ring gear support member, where the circular piston is displaced for translating in linear direction in an element sealed under the effect of a pressure medium and restored into its rest position by a brake retainer spring.

When taking into account the requirements of cooling and lubrication, a further embodiment is of special advantage whereas in the input axle-shaft at least one side of the splines is provided with a conical surface for directing the oil to the disks of the brake assembly.

A simple design results when the wheel hub on its side opposite to the axle housing is sealed off with the planetary carrier fitted with a cover.

The conditions of oil flow are improved in another preferred embodiment where along the inner surface of the cover radial splines are provided for directing flow of the oil from between the teeth of the sun wheel and the planetary gear across the bore of the planet pin.

Another preferred embodiment of the planetary assembly proposed by the present invention largely facilitates the process of checking the wheel hub when for the purpose of determining the wear of the disks the design is provided with a bore passing through the cover and the planetary carrier, and through the internal spline disks, respectively, and ending at the brake piston shut-off with a screw from the outside.

DETAILED DESCRIPTION OF THE PREFERRED EMBODIMENTS

Figure 1:
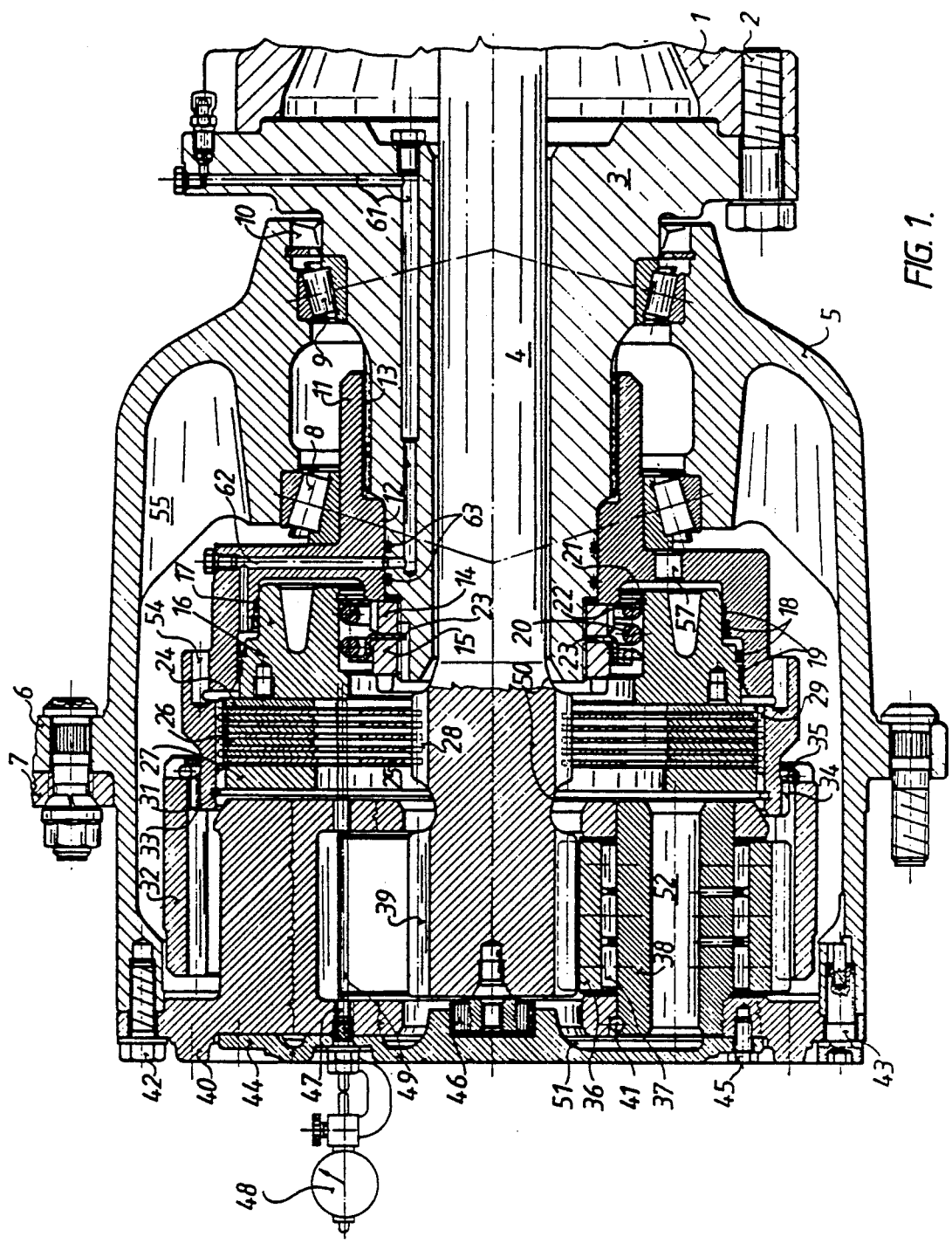
FIG. 1 is an axial sectional view of a preferred embodiment of the planetary assembly realized according to the present invention.

As it should be apparent from FIG. 1, an axle housing 1 of a vehicle is connected with a vehicle spindle 3 of novel construction by the means of a capscrew 2. The driving gear of the vehicle is equipped with an input axle-shaft 4 which is led through the inner cavity of the spindle 3.

On the spindle 3 a wheel hub 5 is rotatably arranged, having a flange 6 carrying a wheel 7 of the vehicle is mounted thereon. The rotatability of the wheel hub 5 is ensured by means of roller bearings 8 and 9, these being taper-roller bearings in this embodiment described by way of example. The inside of the wheel hub 5 is isolated from the outside by the means of a sealing ring 10.

According to the invention a ring gear support member 11 is attached in upright position to the spindle 3. For this purpose the coupling between the spindle 3 and the ring gear support member 11 is partly brought about by the radial close fit of fitting surfaces 12, and partly by an axially arranged spline 13 ensuring torque transmission. From the roller bearings permitting rotation of the wheel hub 5, the anti-friction roller bearing 8 is pushed over the ring gear support member 11, whereas the anti-friction roller bearing 9 is arranged (fixed) on the spindle 3. The outer races of both anti-friction roller bearings are located in the shouldered bores of the wheel hub 5.

The axial position of the ring gear support member 11 can be secured by a bearing nut 14, adjusting thereby, at the same time, the plays, i.e. the bearing clearances of the anti-friction roller bearings 8 and 9. The bearing nut 14 is locked against angular displacement by means of a thrust plate 23 and a second bearing nut 15.

According to the invention a friction brake unit, i.e. a wet disk brake assembly 16 of the wheel hub 5 is fully surrounded by the ring gear support member 11. The wet disk brake assembly 16 is built up with a brake piston 17 designed as an annular piston, it is sealed by brake seal rings 18 and guided by slide rings 19, moving in the bore of the ring gear support member 11. The two slide rings 19 are located over different diameters, so that the brake piston 17 can reciprocatingly move in it without coming into contact with the bore of the ring gear support member 11.

A retainer spring 20 is attached to the brake piston 17, which acts as a compression spring and serves for resetting the brake piston 17 into its rest position. The retainer spring 20 bears, on the one hand, against an annular plate 22 leaning on snap ring 21 mounted in the brake piston 17 and, on the other hand, against the thrust plate 23.

To the outer surface of the brake piston 17, through an interposed push disk 24, internal splined disks 25 and external splined disks 26 are alternately connected. The internal and the external splined disks 25 and 26 are arranged in a succession beside each other and, at the inner end of the stack of the disks, the wet disk brake assembly 16 is confined by a thrust disk 27.

The internal splined disks 25—in the embodiment illustrated here—are attached to splines 28 formed on the input axle-shaft 4, whereas external splined disks 26 can be coupled to splines 29 provided on the inner surface of this end of the ring gear support member 11. Also connected to these splines 29 is the inner push disk 24. The thrust disk 27 is arranged in fixed axial position, this position being defined by a snap ring 31 mounted in ring gear support member 11.

Receding further away from the axle housing of the vehicle, the planetary mechanism follows. It is equipped with a ring gear 32 which is connected to the end of the ring gear support member 11 lying nearer and acts as an element capable of taking up the arising torque in a way still permitting a slight amount of displacement. For this purpose a shoulder 33 is provided in the internally toothed ring gear 32 abutting on the ring gear support member 11. The outer periphery of the ring gear support member 11 is provided with an external gearing 34 meshing with the splines of the ring gear 32. In the other direction, the axial position of the ring gear 32 is defined by a retainer ring 35 located in the groove of the ring gear 32 and on which the external gearing 34 abuts.

The teeth of the ring gear 32 are connected with planetary gears 36, the latter gears being rotatably supported on planet pins 38 by way of needle roller bearings 37. In the planet pin 38 holes 52 are made. The planetary gears 36 are in a conventional way uniformly distributed around a sun gear 39 of the planetary mechanism. The planet pins 38 are fixed in a planetary carrier 40 with the help of balls 41 preventing any rotational and axial displacement. The balls 41 rest in the seatings of the planet pins 38 and fit into the groove of the planetary carrier 40.

The planetary carrier 40 is fixed to the wheel hub 5 by means of screws 42. One of these screws 42 is intended to serve as a drain plug 43.

In the embodiment illustrated in FIG. 1 the sun gear 39 forms a part of the input axle-shaft 4. For this purpose, this end of the input axle-shaft 4 is equipped with teeth meshing with the planetary gears 36.

The wheel hub 5, at its outer end, is closed with a cover 44 fixed with screws 45 on the planetary carrier 40. In the cover 44 a buffer 46 is provided to prevent the axial displacement of the input axle-shaft 4.

In FIG. 1 an especially important feature of the proposed invention is illustrated showing the design of the planetary assembly with the wheel hub 5 permitting easy checking of the wear having taken place on the internal and external splined disks 25 and 26 of the wet disk brake assembly 16. For this purpose in the planetary carrier 40 at least two bores 47 are provided that pass also through the internal and external splined disks 25 and 26, and ultimately end at the surface of the brake piston 17 facing the push disk 24. In the planetary carrier 40 the at least two bores 47 are prepared with internal screw-thread into which the screws 45 plugging the bores 47 are driven. Through at least one of the bores 47 the surface of the brake piston 17 facing the push disk 24 will now become easily accessible. This will permit, after removal of the screw 45 located at one of the bores 47 to connect a dial indicator 48 to the screw-thread of the bore 47 and to make its measuring pin 49 abut on the brake piston 17.

Obviously, the inside of the wheel hub 5 in the planetary assembly realised according to the present invention should be lubricated and cooled. This can be achieved by making a cooling and lubricating liquid, i.e. oil flow in a required manner. For this purpose on both sides of the splines 28 tapered surfaces 50 are provided for directing oil flow present on the input axle-shaft 4 to the internal and external splined disks 25 and 26, under the effect of the centrifugal force resulting from the rotational movement. At the same time the tapered surfaces 50 cause the oil which is squeezed out from between the teeth of the planetary gears 36 and the sun gear 39 to also flow to the internal and external splined disks 25 and 26. The oil squeezed out from between the planetary gears 36 and the sun gear 39 is driven also to the internal and external splined disks 25 and 26 by ribs 51 provided on the cover 44 and acting as blades of a centrifugal pump. Simultaneously, the oil squeezed out from between the planetary gears 31 and the ring gear 32 also flows through the tip clearance of the thrust disk 27 and again to the internal and external splined disks 25 and 26.

The quantity of heat developing in the course of braking is absorbed by the lubricating oil, cooling thereby the wet disk brake assembly 16. The oil heated up from the internal and external splined disks 25 and 26 during braking gets through bores 54 provided in the ring gear support member 11 at the height of the push disk 24 into an oil space 55 of the wheel hub 5, where it comes into contact with the outer wall of the wheel hub 5 and thereby it can cool off. The cooled oil is led again to the internal and external splined disks 25 and 26 through bores 57 provided in the ring gear support member 11 and between the walls of the brake piston 17 and the ring gear support member 11, respectively. In this way, continuous circulation and cooling of the oil is accomplished.

The operation of the brake piston 17 of the wet disk brake assembly 16 is achieved in a conventional way, i.e. by means of a hydraulic arrangement. In this arrangement the brake fluid being under pressure is driven through a bore 61 provided in the spindle 3 and through a further bore 62 in the ring gear support member 11 into a closed space sealed-off between the brake piston 17 and the bore 62 of the ring support member 11. In the transition part from the bore 61 to the bore 62 between the ring gear support member 11 and the spindle 3 the required sealing is obtained by the means of O-rings 63.

Figure 2:
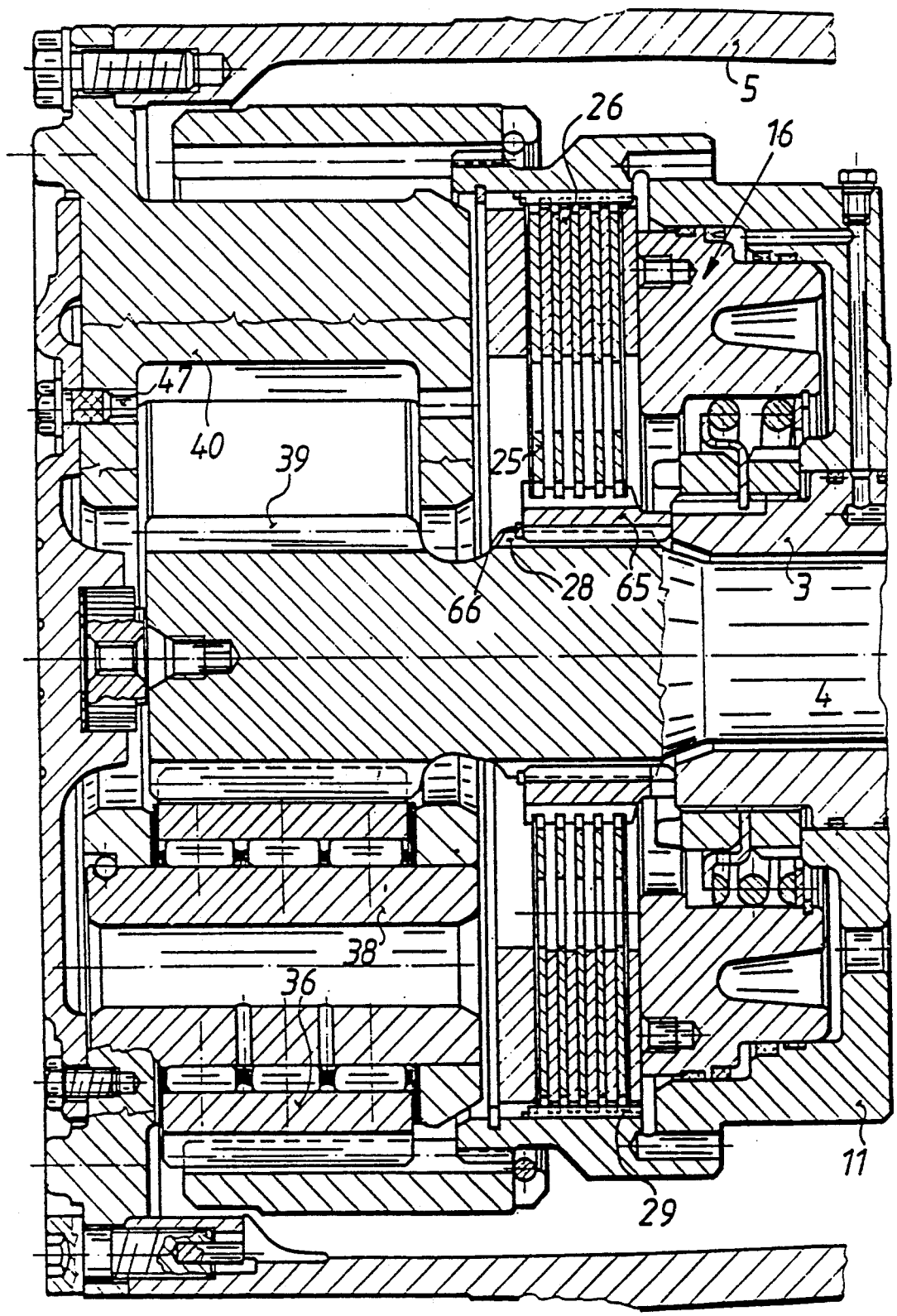
FIG. 2 is a detail of the sectional view shown in FIG. 1 drawn on a larger scale and relating to preferred embodiment.

In FIG. 2 another preferred embodiment of the planetary assembly proposed by the present invention is shown. The main difference in comparison to that illustrated in FIG. 1 lies in the way how the wet disk brake assembly 16 is connected with the input axle-shaft 4. In this embodiment to the splines 28 provided on the input axle-shaft 4 a spacer 65 of annular shape is attached, having splines (not marked with reference sign) meshing with the splines 28 at its inside and another set of splines (not marked either) at its outside, suitable for meshing with the internal splined disks 25. The axial position of the spacer 65 is secured by a guard ring 66 snapped onto the splines 28. The external splined disks 26 are in this embodiment also too, directly linked up with the splines 29 of the ring gear support member 11.

Figure 3:
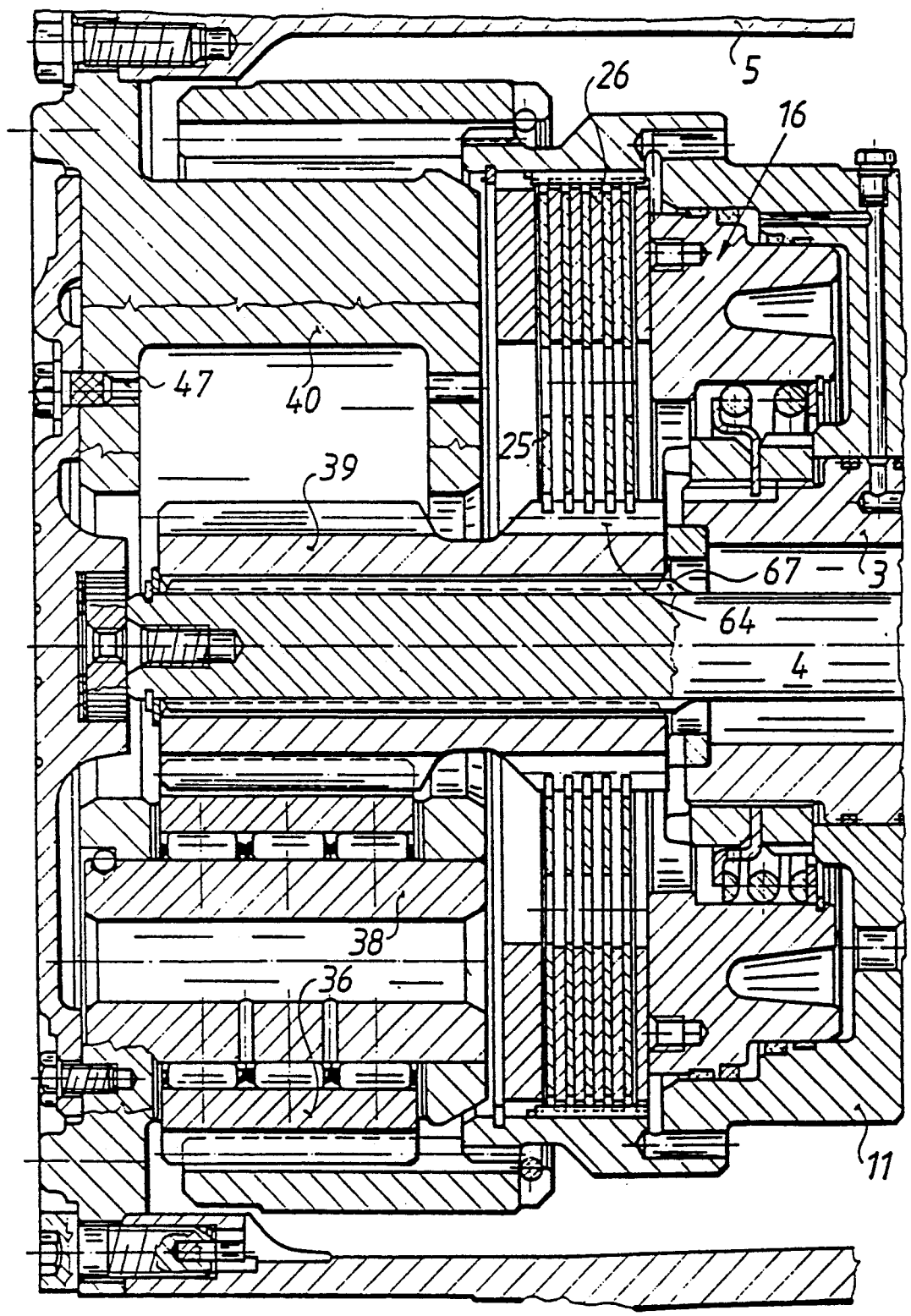
FIG. 3 shows a section of a further preferred embodiment taken in a plane similar to that of FIG. 2.

In FIG. 3 a detail of a further preferred embodiment is illustrated showing differences with respect to the arrangements decribed in the foregoing both in the way of connecting the wet disk brake assembly 16 to the input axle-shaft 4 and in the design of the planetary mechanism located at the end of axle-shaft 4. Namely, here the spacer 65 has an extension 64 provided both with external and internal splines 67. The external splines 67 fulfil the function of the sun gear 39 of the planetary mechanism. Hence, in this case the sun gear 39 does not constitute an integral part with the input axle-shaft 4, but is pulled over the end of the latter as a separate sleeve.

In the case of the described last two embodiments the checking of the disk wear is possible by means of a dial indicator 48 shown in the arrangement of FIG. 1. In the FIG. 3 embodiment too, the bore 47 is provided in the planetary carrier 40, and this bore ends at the surface of the brake piston 17 facing the internal and external splined disks 25 and 26. So, the indicator pin 49 of the dial indicator 48 can bear against that surface, whereby the resultant displacement of the brake piston 17 can be measured from outside.

It is obviously possible to combine the embodiments of FIGS. 2 and 3, i.e. to manufacture an extension 64 fulfilling the task of the sun gear 39 and the spacer 65 serving for attaching the internal splined disks 25 of the wet disk brake assembly 16 so as to constitute separate component parts. In that case the modifications on both the planetary mechanism and the wet disk brake assembly 16 can be performed independently of each other.

Figure 4:
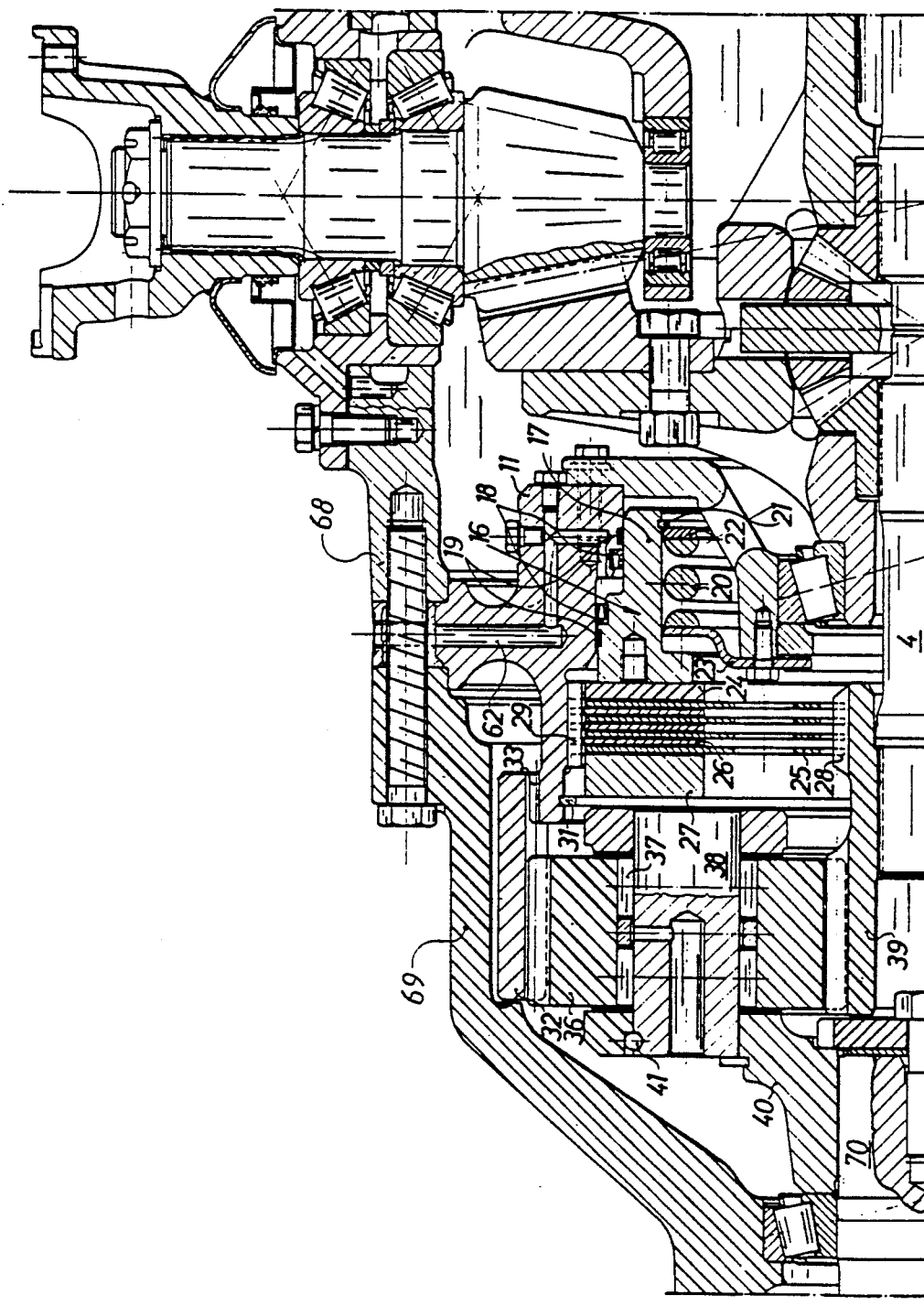
FIG. 4 shows an axial section of an assembly of planetary and brake mechanisms accommodated in the middle part of a running gear of adjustable track width.

A proof of versatility of the planetary assembly proposed by the present invention is that the described wet disk brake assembly 16 may be mounted not only in the wheel hub 5. This is an especially advantageous feature, e.g. in the case of running gears provided with adjustable wheel tracks, where also the planetary mechanism is accommodated in the middle of the running gear. In this case the wet disk brake assembly 16 can be arranged adjacent to the planetary mechanism, in the middle of the running gear, so that the coupling between the planetary mechanism and the wet disk brake assembly 16 remains unchanged. This embodiment is shown in FIG. 4 illustrating that the entire wet disk brake assembly 16 is mounted into the ring gear support member 11. The external splined disks 26 adjoin the internal splines 13 of the ring gear support member 11, whereas the internal splined disks 25 are connected, according to FIGS. 1, 2 and 3, either to the axle-shaft 4 or to the spacer 65 carried and supported by the input axle-shaft 4 or to ribbed extension of the sun gear 39 mounted on the input axle-shaft 4 (shown in FIG. 4). Again, the ring gear 32 is coupled with its internal gearing to the external splines (not marked with reference sign) of the ring gear support member 11 in a way that it is capable of limited self-alignment and suitable for torque transmission. The ring gear support member 11 is attached to fixed stationary elements 68, 69 of the running gear of adjustable wheel track. The fixed elements 68, 69 are stationary castings surrounding the running gear.

The planetary carrier 40 is attached to a rotating output shaft 70 of the running gear. Since the wheel hub constitutes in the running gears of adjustable wheel track an integral part of the applied wheel, there is no construction arranged therein, the wheel is expediently rotated by the rotating output shaft 70 itself, connected to the middle part of the wheel.

The embodiment of the planetary assembly built according to the invention as it is shown in FIG. 1, operates in the following way:

The rotatary motion derived from the drive of the vehicle causes rotation of the input axle-shaft 4 that transfers the torque, on the one hand, to the planetary mechanism of the wheel hub 5, more precisely, to the planetary gears 36 of the planetary mechanism and, on the other hand, the input axle-shaft 4 makes the internal splined disk 25 coupled to the splines 28 rotate.

From the other direction, through the splines 13 the ring gear support member 11 is kept in a stationary position by the spindle 3 coupled to the axle housing 1. To this stationary ring gear support member 11 are connected, in the case of splines 29, the external splined disks 26 and in the case of the external gearing 34, the ring gear 32. The planetary gears 36 mesh with the internal teeth of the ring gear 32, while the rotational motion is transmitted through the planet pins 38 to the planetary carrier 40 and from the latter to the wheel hub 5, finally to the wheel 7 mounted on the flange 6 of the wheel hub 5.

When braking the vehicle, the brake fluid maintained at relatively high pressure gets through the bores 61 and 62 to the sealed space confined between the brake piston 17 of wet disk brake assembly 16 and the ring gear support member 11. Under the effect of the compressive force of the brake fluid the brake piston 17 moves against the force exerted by the retainer spring 20 toward the push disk 24 and bears up on it. The push disk 24 presses the rotating internal splined disks 25 and the stationary external splined disks 26 against the thrust disk 27 fixed in its axial position by the snap ring 31 and simultaneously presses the internal and external splined disks 25 and 26 against each other. The braking effect is produced by friction arising on the internal and external splined disks 25 and 26, on the push disk 24 and on the thrust disk 27, at the end of which, through the splines 28, the input axle-shaft 4 is brought to stand-still. Of course, at the same time, stoppage of the wheel 7 also results.

Cooling and lubrication of the internal and external splined disks 25 and 26 heated up during braking is provided for in a way outlined above in detail, with the help of the tapered surfaces 50, the ribs 51 on the cover 44, the holes 52 of the planet pin 38, the bores 54, 57 of the ring gear support member 11 and the tip clearance of the thrust disk 27.

The design of the planetary assembly shown in FIG. 1, largely facilitates the operation of mounting the wheel hub 5 and other major parts of the planetary assembly proposed by the invention. It is possible to preassemble the brake piston 17, the slide ring 19, the brake seal rings 18, the push disk 24, further the retainer spring 20, the annular plate 22 and the snap ring 21, all belonging to the wet disk brake assembly 16 together with the ring gear support member 11, and to arrange this preassembled unit in the wheel hub 5 as an integral unit.

The planet pins 38 fixed in the planetary carrier 40 together with the needle roller bearings 37 and the planetary gears 36 surrounding the planet pins 38 can similarly constitute preassembled units. Further, this arrangement highly facilitates the repair and renewal of the planetary assembly built with the wheel hub 5 and proposed by the present specification, first of all because the vehicle need not be lifted off from its wheels 7 for dismounting the planetary assembly. With the help of the planetary carrier 40, the planetary mechanism can be removed as an integral unit without dismounting the whole assembly, making thereby the wet disk brake assembly 16 directly accessible. So, after the removal of the snap ring 31, easy and direct replacement of the internal and external splined disks 25 and 26 becomes possible.

It is a further important advantage of the planetary assembly proposed by the invention that the operation of checking the wet disk brake assembly 16, which is necessary e.g. in the course of the prescribed frequent technical examinations, can be carried out in a very simple way and without dismantling the wheel hub 5 to any extent. Moreover by means of the dial indicator 48 the resultant displacement of the brake piston 17 can be checked, by which all values of wear are revealed. The value measured in this way may be considered as a final result as concerns the technical condition of the wet disk brake assembly 16.

The way of functioning of the embodiment shown in FIG. 2 is largely identical with that of the arrangement illustrated in FIG. 1. The only difference lies in the suitability of the wet disk brake assembly 16 to take up higher loads, by virtue of applying the spacer 65, because a higher torque can be taken over by the latter component at its periphery from the internal splined disk 25. This load is then transmitted by the 65 spacer in the form of distributed tooth load to the splines 28 of the input axle-shaft 4. Thus, the application of this embodiment may bring advantages in conditions where the wet disk brake assembly 16 is required to take up relatively higher loads.

Another advantage offered by the arrangement of FIG. 2 lies in the possibility of applying identical external and internal splined disks 25 and 26 for planetary assemblies of different ratios, so that the respective parts can be manufactured in large series in a more economical way then in the case of the planetary assemblies of the prior art.

In comparison to the embodiments shown in FIGS. 1 and 2, there are no important differences in functioning of the planetary assembly realized according to the invention embodiment shown in FIG. 3. Because the sun gear 39 and the input axle-shaft 4 constitute separate components this embodiment can form a construction of high elasticity, by permitting realization of different transmission ratios by simply changing the sun gear 39 and rendering possible the dimensioning of the wheel hub 5 to withstand different loads. There is also no appreciable difference between the operation of the planetary assembly shown in FIG. 4 and that shown in FIGS. 1, 2 and 3.

According to experience gained with some experimental specimens off the planetary assembly proposed by the present invention, not only the accomplishment of the relatively complex task set as aim of the invention becomes possible, but also some additional unexpected advantages arise.

The braking effect is astonishingly good, no resonance or vibrations occur. Main reason for this lies in the way the internal and external splined disks 25 and 26 of wet disk brake assembly 16 are coupled to rigidly clamped elements, i. e. to the input axle-shaft 4 and to the ring gear support member 11, respectively, and these elements are capable of, so to speak, "short-circuiting" the reaction forces arising in the course of braking.

From the point of view of tooth wear and load transmission it is a favourable feature of the planetary assembly proposed by the invention that the method of attaching the ring gear 32 to the ring gear support member 11 permits a limited displacement and self-alignment between the parts, by virtue of which the ring gear 32 can adapt itself to the planetary gears 36. Consequently, the distribution of load acting on the teeth will be uniform along the entire width of the meshing teeth.

The arrangement of wet disk brake assembly 16 being fully incorporated in the ring gear support member 11 offers further advantages. By virtue of realizing the invented planetary assembly, no load whatsoever resulting from the disk reaction forces or torque or from the action of the brake piston 17 is transferred to the ring gear 32 or to the planetary carrier 40 during braking. Consequently, no deformation of these elements will take place under load, so that the teeth, the splines 13 and the roller bearings 8 and 9 of the wheel 7 will not be subject to increased wear due to such deformation.

What is claim is:

1. A planetary assembly with wet disk brake, comprising
    a hollow spindle rigidly fixed to an axle housing of a running gear of a vehicle,
    a hollow wheel hub carrying a wheel of said vehicle, said wheel hub being rotatably supported in a roller bearing mounted to said spindle,
    an input axle-shaft passing through a bore in said spindle,
    a hollow ring gear support member arranged on a periphery of said spindle and being secured against angular displacement relative to said spindle; the ring gear support member having external and internal splines,
    a planetary mechanism including planetary gears connected to a sun gear, said planetary mechanism being linked with said input axle-shaft on an input side thereof and with said wheel hub on an output side thereof, said planetary mechanism further including a ring gear coupled in a torque transmitting way to said external splines of said ring gear support member,
    a retainer ring received in the ring gear and cooperating with a part of said ring gear support member for limiting a displacement of the ring gear relative to the ring gear support member in a first axial direction,
    a shoulder forming part of said ring gear and cooperating with a part of said ring gear support member for limiting a displacement of the ring gear relative to the ring gear support member in a second axial direction; said first and second axial directions being oppositely oriented,
    a wet disk brake assembly fully accommodated in said ring gear support member as a self-contained unit, said wet disk brake assembly comprising external splined disks, internal splined disks, a thrust disk, and a brake piston,
    said wet disk brake assembly being arranged so that said external splined disks and said thrust disk mesh with said internal splines of said ring gear support member,
    wherein said thrust disk bears axially against said ring gear support member, and said brake piston is guided in said ring gear support member in an axially displaceable and sealed way.

2. A planetary assembly with wet disk brake, comprising
    a hollow spindle rigidly fixed to an axle housing of a running gear of a vehicle, a hollow wheel hub carrying a wheel of said vehicle, said wheel hub being rotatably supported in a roller bearing mounted to said spindle, an input axle-shaft passing through a bore in said spindle, a hollow ring gear support member arranged on a periphery of said spindle and being secured against angular displacement relative to said spindle; the ring gear support member having external and internal splines, a planetary mechanism including a planetary gear carrier, planetary gears mounted on the planetary gear carrier by planetary gear pins provided with a throughgoing hole, said planetary gears being connected to a sun gear; said planetary mechanism being linked with said input axle-shaft on an input side thereof and with said wheel hub on an output side thereof, said planetary mechanism further including a ring gear coupled in a torque transmitting way to said external splines of said ring gear support member, a wet disk brake assembly fully accommodated in said ring gear support member as a self-contained unit, said wet disk brake assembly comprising external splined disks, internal splined disks, a thrust disk, and a brake piston, said wet disk brake assembly being arranged so that said external splined disks and said thrust disk mesh with said internal splines of said ring gear support member, a cover attached to said planetary gear carrier for closing the wheel hub at an end remote from said axle housing, radial ribs provided on an inner surface of said cover for conveying oil from between said sun gear and teeth of said planetary gears through the holes of the planetary gear pins to said external and internal splined disks, wherein said thrust disk bears axially against said ring gear support member, and said brake piston is guided in said ring gear support member in an axially displaceable and sealed way.

3. A planetary assembly with wet disk brake, comprising a hollow spindle rigidly fixed to an axle housing of a running gear of a vehicle, a hollow wheel hub carrying a wheel of said vehicle, said wheel hub being rotatably supported in a roller bearing mounted to said spindle, an input axle-shaft passing through a bore in said spindle, a hollow ring gear support member arranged on a periphery of said spindle and being secured against angular displacement relative to said spindle; the ring gear support member having external and internal splines, a planetary mechanism including planetary gears connected to a sun gear, said planetary mechanism being linked with said input axle-shaft on an input side thereof and with said wheel hub on an output side thereof, said planetary mechanism further including a ring gear coupled in a torque transmitting way to said external splines of said ring gear support member, a wet disk brake assembly fully accommodated in said ring gear support member as a self-contained unit, said wet disk brake assembly comprising external splined disks, internal splined disks, a thrust disk, and a brake piston, said wet disk brake assembly being arranged so that said external splined disks and said thrust disk mesh with said internal splines of said ring gear support member, a cover attached to said planetary gear carrier for closing the wheel hub at an end remote from said axle housing, means defining a bore passing through said cover, said planetary gear carrier and said internal splined disks and ending adjacent a surface of said brake piston for permitting a verification of wear of said internal and external splined disks, a screw received in the bore for closing the bore to the outside, wherein said thrust disk bears axially against said ring gear support member, and said brake piston is guided in said ring gear support member in an axially displaceable and sealed way.

4. A planetary assembly as set forth in claim 1 wherein an end of said input axle-shaft is provided with a toothing constituting said sun gear of said planetary mechanism.

5. A planetary assembly as set forth in claim 4, wherein said internal splined disks of said wet disk brake assembly are coupled in a torque transmitting way to splines provided on said input axle-shaft.

6. A planetary assembly as set forth in claim 4, wherein said internal splined disks of said wet disk brake assembly are coupled to external splines of a spacer meshing with splines on said input axle-shaft.

7. A planetary assembly as set forth in claim 1, wherein to a splinded end of said input axle-shaft said sun gear of said planetary mechanism is attached by means of splines.

8. A planetary assembly as set forth in claim 7, wherein said internal splined disks of said wet disk brake assembly are coupled to an external splined extension of said sun gear in a torque transmitting way.

9. A planetary assembly as set forth in claim 1, wherein said spindle and said ring gear support member are interconnected by close respective cylindrical fitting surfaces on said spindle and said ring gear support member and by respective torque transmitting splines on said spindle and said ring gear support member adjacent said fitting surfaces.

10. A planetary assembly as set forth in claim 1, wherein said wheel hub is supported on said spindle and on said ring gear support member by anti-friction roller bearings further wherein for the adjustment of an axial position of said ring gear support member on said spindle and of the play of said anti-friction roller bearings at least one roller bearing nut is provided on said spindle.

11. A planetary assembly as set forth in claim 1, wherein said external splined disks and said internal splined disks of said wet disk brake assembly are arranged alternately between said thrust disk and said brake piston.

12. A planetary assembly as set forth in claim 11, wherein said thrust disk is secured against angular displacement by meshing with said internal splines of said ring gear support member, and against axial displacement in the direction opposite to that of said internal and external splined disks by a snapring held in said ring gear support member.

13. A planetary assembly as set forth in claim 11, wherein said brake piston displaced under the action of the pressure of a fluid medium in a sealed-off bore of said ring gear support member forms an annular piston to which a compression retainer spring is attached to cause said brake piston to return into a rest positon.

14. A planetary assembly as set forth in claim 1, wherein on at least one side of said splines of said axle-shaft tapered surfaces are provided to direct oil onto said internal and external splined disks of said wet disk brake assembly.

15. A planetary assembly as set forth in claim 1, wherein said wheel hub at its end opposite to said axle housing is confined by said planetary carrier provided with a cover.

* * * * *